(12) United States Patent
Yamashita et al.

(10) Patent No.: US 8,051,659 B2
(45) Date of Patent: Nov. 8, 2011

(54) CONTROL APPARATUS FOR INTERNAL COMBUSTION ENGINE AND METHOD FOR CONTROLLING THE SAME

(75) Inventors: Akira Yamashita, Susono (JP); Isao Matsumoto, Suntou-gun (JP); Naofumi Magarida, Susono (JP); Hiroki Murata, Gotenba (JP); Hiroyuki Haga, Susono (JP); Takenori Saoda, Susono (JP)

(73) Assignee: Toyota Jidosha Kabushiki Kaisha, Aichi-Ken (JP)

( * ) Notice: Subject to any disclaimer, the term of this patent is extended or adjusted under 35 U.S.C. 154(b) by 338 days.

(21) Appl. No.: 12/373,351

(22) PCT Filed: Feb. 5, 2008

(86) PCT No.: PCT/IB2008/000258
§ 371 (c)(1),
(2), (4) Date: Jan. 12, 2009

(87) PCT Pub. No.: WO2008/099248
PCT Pub. Date: Aug. 21, 2008

(65) Prior Publication Data
US 2009/0308071 A1    Dec. 17, 2009

(30) Foreign Application Priority Data
Feb. 13, 2007    (JP) .................................. 2007-031872

(51) Int. Cl.
*F02D 23/00* (2006.01)
*F02B 37/12* (2006.01)
*F02M 25/07* (2006.01)
*F02B 47/10* (2006.01)

(52) U.S. Cl. ...... 60/602; 60/605.2; 60/278; 123/568.11; 123/568.12

(58) Field of Classification Search ............... 60/602, 60/605.2, 277, 278, 287, 288; 123/568.11, 123/568.12; 165/52; F02B 19/04, 37/12, F02B 47/10; F02D 23/00; F02M 25/07
See application file for complete search history.

(56) References Cited

U.S. PATENT DOCUMENTS
3,817,221 A * 6/1974 Nohira et al. ............... 123/25 Q
(Continued)

FOREIGN PATENT DOCUMENTS
FR    2 876 416 A1    4/2006
(Continued)

OTHER PUBLICATIONS
Machine translation of JP09-256915.*
(Continued)

*Primary Examiner* — Quyen Leung
*Assistant Examiner* — Michael Andrews
(74) *Attorney, Agent, or Firm* — Sughrue Mion, PLLC

(57) ABSTRACT

A control apparatus for an internal combustion engine includes an exhaust gas recirculation unit; an intercooler that is provided in the intake passage, at a position downstream of a position to which the exhaust gas is recirculated back; a bypass passage through which an intake air flow bypasses the intercooler. When it is determined that the pH of the condensed water obtained from the exhaust gas is at the level at which the intercooler corrodes in the state where the exhaust gas is recirculated back by the exhaust gas recirculation unit, the control apparatus executes a control for cutting off an intake air flow toward the intercooler to direct the intake air flow only to the bypass passage. Thus, it is possible to ensure reliability of the intercooler.

12 Claims, 6 Drawing Sheets

U.S. PATENT DOCUMENTS

| | | | |
|---|---|---|---|
| 6,301,887 B1 * | 10/2001 | Gorel et al. | 60/605.2 |
| 6,367,256 B1 * | 4/2002 | McKee | 60/605.2 |
| 6,422,219 B1 * | 7/2002 | Savonen et al. | 123/568.12 |
| 6,725,847 B2 * | 4/2004 | Brunemann et al. | 123/568.12 |
| 6,934,621 B2 * | 8/2005 | Bhargava et al. | 701/108 |

FOREIGN PATENT DOCUMENTS

| | | | |
|---|---|---|---|
| JP | 6-257518 A | | 9/1994 |
| JP | 07-324653 A | | 12/1995 |
| JP | 8-14111 A | | 1/1996 |
| JP | 8-232784 A | | 9/1996 |
| JP | 09-256915 A | | 9/1997 |
| JP | 09256915 A | * | 9/1997 |
| JP | 2005-146919 A | | 6/2005 |
| JP | 2005146919 A | * | 6/2005 |
| WO | 2006/126993 A1 | | 11/2006 |

OTHER PUBLICATIONS

Machine translation of JP2005-146919.*

* cited by examiner

CONTROL APPARATUS FOR INTERNAL COMBUSTION ENGINE AND METHOD FOR CONTROLLING THE SAME

BACKGROUND OF THE INVENTION

1. Field of the Invention

The invention relates to a control apparatus for an internal combustion engine, which includes an exhaust gas recirculation passage through which exhaust gas is recirculated back from an exhaust passage to an intake passage, and a method for controlling the same.

2. Description of the Related Art

There has been suggested an exhaust gas recirculation (EGR) system for an internal combustion engine, for example, a diesel engine. The exhaust gas recirculation system recirculates a portion of exhaust gas back from an exhaust passage to an intake passage to decrease the combustion temperature in the engine, thereby suppressing generation of NOx. For example, an EGR system that recirculates exhaust gas back to an intake system from an exhaust passage at a portion downstream of a catalyst (hereinafter, referred to as a "low-pressure loop EGR system") has been suggested. Japanese Patent Application Publication No. 2005-146919 (JP-A-2005-146919) describes a technology related to a low-pressure loop EGR system. According to the technology, a control for supplying gas into a passage, through which a gas flow bypasses an intercooler, is executed during the transitional state, whereby the amount of exhaust gas contained in the gas taken into a combustion chamber is promptly adjusted to a desired amount. According to this technology, the bypass passage passes close by the engine.

However, the technology described in JP-A-2005-146919 has a disadvantage that the intercooler may corrode if the condensed water, which is obtained from the exhaust gas and recirculated by the low-pressure EGR system, is supplied to the intercooler. Such corrosion may occur if strongly acidic condensed water is supplied to the intercooler.

SUMMARY OF THE INVENTION

The invention provides a control apparatus for an internal combustion engine that executes a control for supplying an intake air to a bypass passage, through which an intake air flow bypasses an intercooler, based on the pH of the condensed water obtained from the exhaust gas, thereby ensuring reliability of the intercooler, and a method for controlling the control apparatus.

A first aspect of the invention relates to a control apparatus for an internal combustion engine. The control apparatus includes: an exhaust gas recirculation unit that recirculates exhaust gas back from an exhaust passage, at a portion downstream of a turbine of a turbocharger and a catalyst, to an intake passage, at a portion upstream of a compressor of the turbocharger; an intercooler that is provided in the intake passage, at a position downstream of a position to which the exhaust gas is recirculated back by the exhaust gas recirculation unit; a bypass passage through which an intake air flow bypasses the intercooler; a pH determination unit that determines a pH of the condensed water obtained from the exhaust gas recirculated back by the exhaust gas recirculation unit by estimation or detection; a corrosion determination unit that determines whether the pH of the condensed water obtained from the exhaust gas is at a level at which the intercooler corrodes, based on the pH determined by the pH determination unit; and a bypass control unit that executes a control for cutting off an intake air flow toward the intercooler to direct the intake air flow only to the bypass passage, when the corrosion determination unit determines that the pH of the condensed water obtained from the exhaust gas is at the level at which the intercooler corrodes in a state where the exhaust gas is recirculated back by the exhaust gas recirculation unit.

The control apparatus according to the first aspect of the invention is appropriately applied to, for example, a diesel engine provided with a turbocharger. The exhaust gas recirculation unit recirculates the exhaust gas back from the exhaust passage, at the portion downstream of the turbine of the turbocharger and the catalyst, to the intake passage, at the portion upstream of the compressor of the turbocharger. The intercooler is provided in the intake passage, at the position downstream of the position to which the exhaust gas is recirculated back by the exhaust gas recirculation system. The intercooler cools the gas that is supplied thereto. The intake air flow bypasses the intercooler through the bypass passage. The pH determination unit determines the pH of the condensed water obtained from the exhaust gas recirculated back by the exhaust gas recirculation unit by estimation or detection. The corrosion determination unit determines whether the pH of the condensed water obtained from the exhaust gas is at the level at which the intercooler corrodes. The bypass control unit executes the control for cutting off the flow of the intake air (fluid that contains not only the air take in from the outside of the vehicle but also the exhaust gas that is recirculated by exhaust gas recirculation unit and the condensed water obtained from the exhaust gas) toward the intercooler to direct the intake air flow only to the bypass passage, when the corrosion determination unit determines that the pH of the condensed water obtained from the exhaust gas is at the level at which the intercooler corrodes in the state where the exhaust gas is recirculated back by the exhaust gas recirculation unit. Thus, it is possible to appropriately prevent supply of strongly acidic exhaust gas condensed water to the intercooler. Namely, it is possible to appropriately prevent occurrence of corrosion environment under which the intercooler corrodes. Therefore, it is possible to increase the corrosion resistance life of the intercooler, and effectively suppress deterioration of the function and performance of the intercooler due to corrosion of the intercooler. In addition, it is no longer necessary to apply treatment for providing corrosion resistance to the intercooler. As a result, it is possible to ensure reliability of the intercooler.

In the control apparatus according to the first aspect of the invention, the pH determination unit may estimate the pH of the condensed water obtained from the exhaust gas, based on at least one of the rotational speed of the internal combustion engine, the fuel injection amount, and the temperature of the catalyst. Thus, it is possible to accurately estimate the pH of the condensed water obtained from the exhaust gas.

In the control apparatus according to the first aspect of the invention, the pH determination unit may detect the pH of the condensed water obtained from the exhaust gas using a sensor that is provided to the intake passage, at a position upstream of the position at which the intercooler is provided and downstream of the position to which the exhaust gas is recirculated back by the exhaust gas recirculation unit.

Preferably, the bypass passage is defined by a member that is made of a material having a high corrosion resistance. Thus, it is possible to appropriately prevent occurrence of corrosion in the bypass passage, even when strongly acidic exhaust gas condensed water is supplied to the bypass passage.

A second aspect of the invention relates to a method for controlling a control apparatus for an internal combustion engine. The control apparatus includes: an exhaust gas recirculation unit that recirculates exhaust gas back from an exhaust passage, at a portion downstream of a turbine of a turbocharger and a catalyst, to an intake passage, at a portion upstream of a compressor of the turbocharger; an intercooler that is provided in the intake passage, at a position downstream of a position to which the exhaust gas is recirculated back by the exhaust gas recirculation unit; and a bypass passage through which an intake air flow bypasses the intercooler. According to the method, a pH of the condensed water obtained from the exhaust gas recirculated back by the exhaust gas recirculation unit is determined by estimation or detection, and whether the pH of the condensed water obtained from the exhaust gas is at a level at which the intercooler corrodes is determined based on the determined pH. Then, a control for cutting off an intake air flow toward the intercooler to direct the intake air flow only to the bypass passage is executed, when it is determined that the pH of the condensed water obtained from the exhaust gas is at the level at which the intercooler corrodes in a state where the exhaust gas is recirculated back by the exhaust gas recirculation unit.

BRIEF DESCRIPTION OF THE DRAWINGS

The foregoing and further objects, features and advantages of the invention will become apparent from the following description of example embodiments with reference to the accompanying drawings, wherein the same or corresponding portions will be denoted by the same reference numerals and wherein.

DETAILED DESCRIPTION OF THE EMBODIMENTS

Hereafter, embodiments of the invention will be described with reference to the accompanying drawings.

First Embodiment of the Invention

Figure 1:
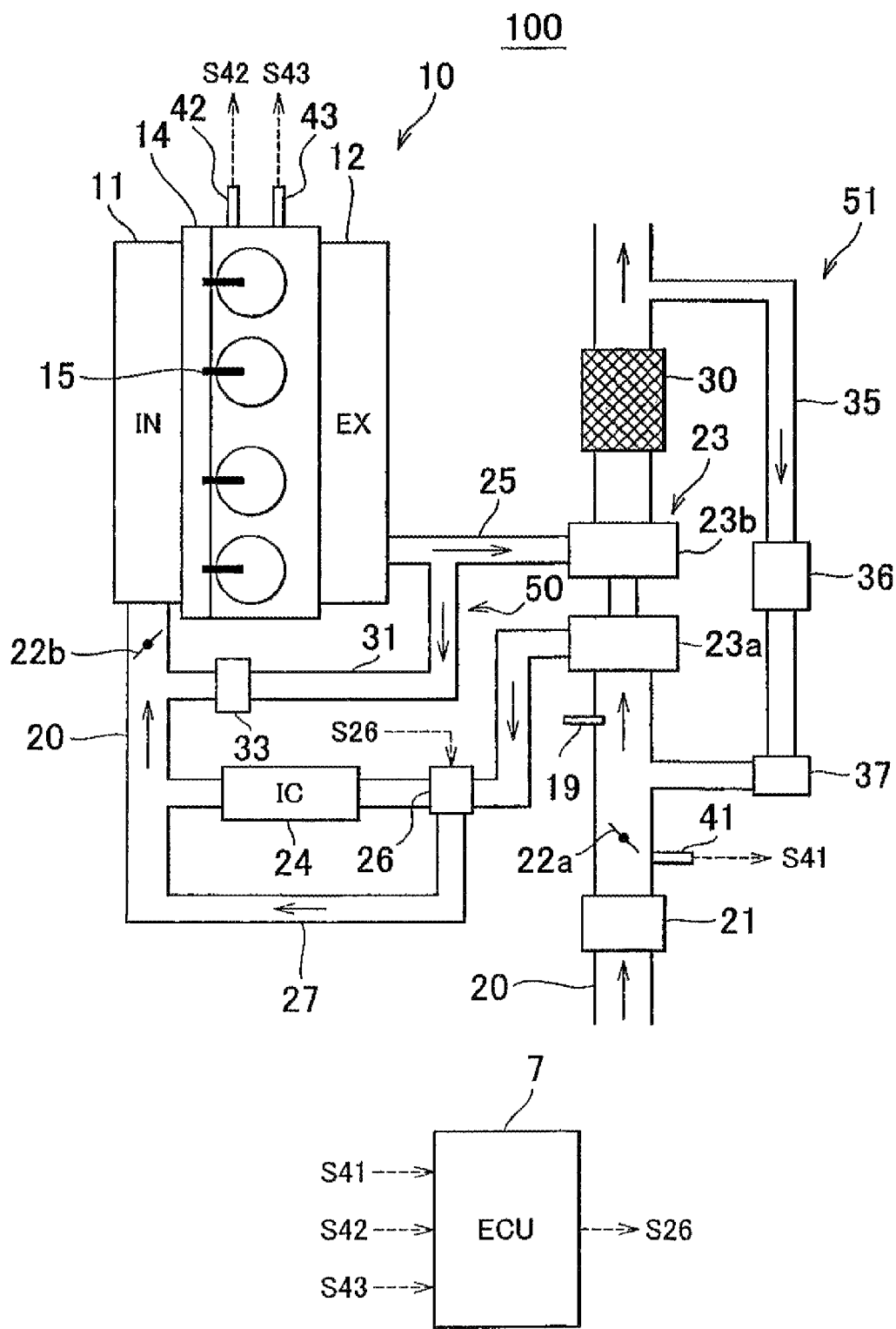
FIG. 1 is a block diagram schematically showing the structure of a control apparatus for an internal combustion engine according to a first embodiment of the invention.

First, a first embodiment of the invention will be described.
Structure of Apparatus FIG. 1 is a block diagram schematically showing the structure of a control apparatus 100 for an internal combustion engine according to the first embodiment of the invention. In FIG. 1, solid arrows indicate a flow of the intake air and a flow of the exhaust gas, and dashed arrows indicate control signals and detection signals.

The control apparatus 100 in FIG. 1 includes an internal combustion engine 10 that is an in-line four-cylinder diesel engine. Each cylinder of the internal combustion engine 10 is connected to an intake manifold 11 and an exhaust manifold 12. The internal combustion engine 10 has fuel injection valves 15 provided to the respective cylinders, and a common-rail 14 that supplies high-pressure fuel to the fuel injection valves 15. The high-pressure fuel is supplied to the common-rail 14 by a fuel pump (not shown). An engine speed sensor 42 detects the rotational speed of the internal combustion engine 10, and transmits a detection signal S42 indicating the engine speed to an ECU 7. A coolant temperature sensor 43 detects the temperature of a coolant (hereinafter, referred to as "coolant temperature") that cools the internal combustion engine 10, etc., and transmits a detection signal S43 indicating the coolant temperature to the ECU 7.

An intake passage 20 is connected to the intake manifold 11. Connected to the intake passage 20 are: an air cleaner 21 that purifies the air flowing into the internal combustion engine 10; an intake air temperature sensor 41 that detects the intake air temperature; a throttle valve 22a; a blow-by gas supply unit 19 that recirculates blow-by gas extracted from, for example, a crankcase back to an intake system; a compressor 23a of a turbocharger 23; an intercooler (IC) 24 that cools the intake air; and a throttle valve 22b. In addition, the intake passage 20 has a bypass passage 27 through which the intake air flow bypasses the intercooler 24. In this case, the bypass passage 27 is connected to the intake passage 20 via a selector valve 26. The bypass passage 27 is defined by a member made of a material having a high corrosion resistance (e.g. SUS). The selector valve 26 is formed of, for example, a three-way valve. The selector valve 26 selects the passage, through which the intake air flows, between the intake passage 20 provided with the intercooler 24 and the bypass passage 27 through which the intake air flow bypasses the intercooler 24. The selector valve 26 is controlled according to a control signal S26 transmitted from the ECU 7. The intake air temperature sensor 41 transmits a signal S41 indicating the detected intake air temperature to the ECU 7.

An exhaust passage 25 connected to the exhaust manifold 12 is provided with a turbine 23b of the turbocharger 23 and a catalyst 30. The catalyst 30 is formed of, for example, an oxidation catalyst or a DPF (diesel particulate filter).

The control apparatus 100 for an internal combustion engine includes an EGR unit 50 that recirculates a portion of the exhaust gas from the exhaust passage 25, at a portion upstream of the turbine 23b, to an intake passage, at a portion downstream of the compressor 23a (hereinafter, referred to as "high-pressure loop EGR unit 50"), and an EGR unit 51 that recirculates a portion of the exhaust gas from the exhaust passage, at a portion downstream of the turbine 23b and the catalyst 30, to the intake passage, at a portion upstream of the compressor 23a (hereinafter, referred to as "low-pressure loop EGR unit 51"). The high-pressure loop EGR unit 50 includes an EGR passage 31 and an EGR valve 33. The EGR passage 31 provides communication between the exhaust passage 25, at a portion upstream of the turbine 23b, and the intake passage 20, at a portion downstream of the intercooler 24. The EGR valve 33 that controls the amount of exhaust gas recirculated back to the internal combustion engine 10 is provided in the EGR passage 31. The low-pressure loop EGR unit 51 includes an EGR passage 35, an EGR cooler 36, and an EGR valve 37. The EGR passage 35 provides communication between the exhaust passage 25, at a portion downstream of the catalyst 30, and the intake passage 20, at a portion upstream of the compressor 23a. The EGR cooler 36 that cools the EGR gas and the EGR valve 37 that controls the amount of EGR gas are provided in the EGR passage 35.

The components of the control apparatus 100 are controlled by the ECU 7. The ECU 7 is formed of a CPU (Central Processing Unit), ROM (Read Only Memory), RAM (Random Access Memory), etc. The ECU 7 transmits a control signal S26 to the selector valve 26 based mainly on detection signals S41, S42 and S43 from the intake air temperature sensor 41, the engine speed sensor 42, and the coolant temperature sensor 43, respectively. Namely, the ECU 7 executes a control for selecting the passage, through which the intake air flows, between the passage provided with the intercooler 24 and the bypass passage 27 through which the intake air flow bypasses the intercooler 24 (hereinafter, referred to as "bypass control").

According to the first embodiment of the invention, the ECU 7 estimates the pH of the condensed water obtained from the exhaust gas that is recirculated by the low-pressure loop EGR unit 51. When it is determined that the pH of the condensed water is at a level at which the intercooler 24 will corrode, the ECU 7 executes a control for cutting off the intake air flow toward the intercooler 24 to direct the intake air flow only to the bypass passage 27. As described above, the ECU 7 corresponds to a pH determination unit, a corrosion determination unit, and a bypass control unit. Although the ECU 7 executes controls over the other components of the control apparatus 100, descriptions of the controls, which are not particularly related to the first embodiment of the invention, will not be provided below.

The first embodiment of the invention may be applied not only to the in-line four-cylinder internal combustion engine 10 but also to an internal combustion engine having cylinders of which the number is other than four, or a V-engine in which two rows of cylinders are placed at a predetermined angle to each other. In addition, the first embodiment of the invention may be applied not only to the internal combustion engine 10 having direct-injection fuel injection valves 15 but also to an internal combustion engine having port-injection fuel injection valves.

Bypass Control Method

Next, a bypass control method according to the first embodiment of the invention will be described in detail.

According to the first embodiment of the invention, the ECU 7 executes a bypass control so that the intake air is supplied to the bypass passage 27 through which the intake air flow bypasses the intercooler 24, when it is determined that the intercooler 24 is under the corrosion environment. More specifically, the ECU 7 estimates the pH of the condensed water obtained from the exhaust gas that is recirculated back to the internal combustion engine 10 by the low-pressure loop EGR unit 51. When it is determined that the pH of the condensed water is at a level at which the intercooler 24 will corrode, the ECU 7 executes a control for cutting off the intake air flow toward the intercooler 24 to direct the intake air flow only to the bypass passage 27. In this specification, the term "intake air" signifies the fluid that may contain not only the air taken in from the outside of the vehicle but also the exhaust gas that is recirculated by the low-pressure loop EGR unit 51 and the condensed water obtained from the exhaust gas.

The bypass control is executed for the following reason. In the internal combustion engine 10 including the low-pressure loop EGR unit 51, strongly acidic condensed water tends to be produced due to condensation of the exhaust gas (hereinafter, referred to as "exhaust gas condensed water" where appropriate). When such exhaust gas condensed water is introduced into the intake system and then supplied to the intercooler 24, the intercooler 24 may corrode because the intercooler 24 is usually made of, for example, aluminum. Corrosion of the intercooler 24 may affect the reliability of the intercooler 24.

Therefore, according to the first embodiment of the invention, the pH of the exhaust gas condensed water is estimated. Then, if the pH of the exhaust gas condensed water indicates that the exhaust gas condensed water is strongly acidic (for example, pH<3), namely, when the intercooler 24 is under the corrosion environment, the control for cutting off the intake air flow toward the intercooler 24 to direct the intake air flow only to the bypass passage 27 is executed. According to the bypass control method described above, it is possible to increase the corrosion resistance life of the intercooler 24, and to effectively suppress deterioration of the function and performance of the intercooter 24 due to corrosion. In addition, it is possible to prevent occurrence of the situation in which the exhaust gas condensed water is produced due to condensation of the exhaust gas in the intercooler 24 and the intercooler 24 is corroded by the exhaust gas condensed water. Because the bypass passage 27 is defined by the member made of a material having a high corrosion resistance, the possibility that the member that forms the bypass passage 27 will corrode is considerably low.

Next, the method for estimating the pH of the exhaust gas condensed water according to the first embodiment of the invention will be described. The pH of the exhaust gas condensed water tends to change depending on the combustion condition (e.g. NOx concentration), the catalyst state, the gas temperature, the fuel property, etc. Namely, the pH of the exhaust gas condensed water is influenced by the components of exhaust gas and a catalyst reaction, and varies depending on the degree to which the internal combustion engine 10 has been warmed. It is considered that the pH of the exhaust gas condensed water is correlated with $NO_3$, $SO_4$, an acetate ion, and a formic ion. More specifically, the pH of the exhaust gas condensed water is expressed by Equation 1).

$$pH = -\log [H^+] = -\log \{a \times [NO_3^-] + b \times [CH_3COO^-] + c \times [HCOO^-] + d \times [SO_4^{2-}]\} \quad \text{Equation 1)}$$

The characters "a" to "d" in Equation 1) correspond to the degrees of influence of the respective ions. For example, "a≈1", "b≈0.037", "c≈0.008", and "d≈2". Thus, the pH of the exhaust gas condensed water is significantly influenced by $[NO_3^-]$ and $[SO_4^{2-}]$. Here, $[NO_3^-]$ is influenced by the combustion condition (load condition) in the internal combustion engine 10, and $[SO_4^{2-}]$ is influenced by the fuel property.

Based on the facts described above, it is considered that the pH of the exhaust gas condensed water indicates that the exhaust gas condensed water is strongly acidic in the high NOx concentration region in which the internal combustion engine 10 operates at high speed and high load or the catalyst inactivate condition under which the internal combustion engine 10 operates at low speed and low load. Therefore, according to the first embodiment of the invention, the ECU 7 estimates the pH of the exhaust gas condensed water based on the operating condition of the internal combustion engine 10 (for example, engine speed, fuel injection amount and temperature of the catalyst 30).

Figure 2A:
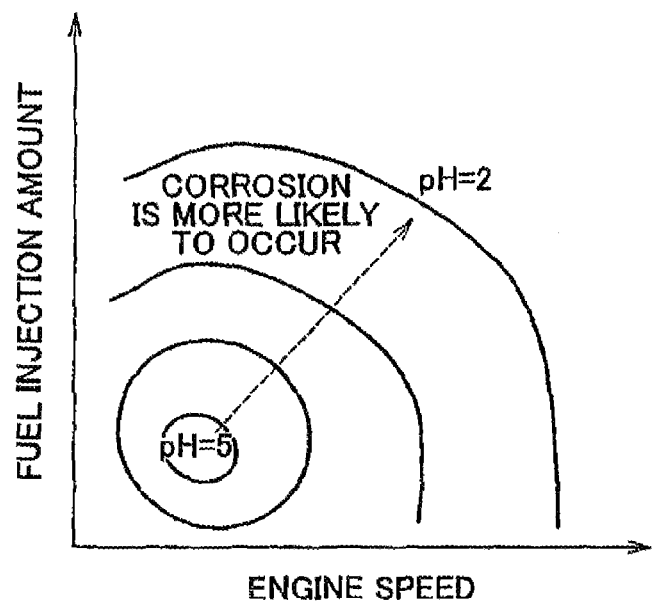
FIG. 2A and FIG. 2B are graphs each showing the relationship between the operating condition of the internal combustion engine and the pH of the condensed water obtained from the exhaust gas.
Figure 2B:
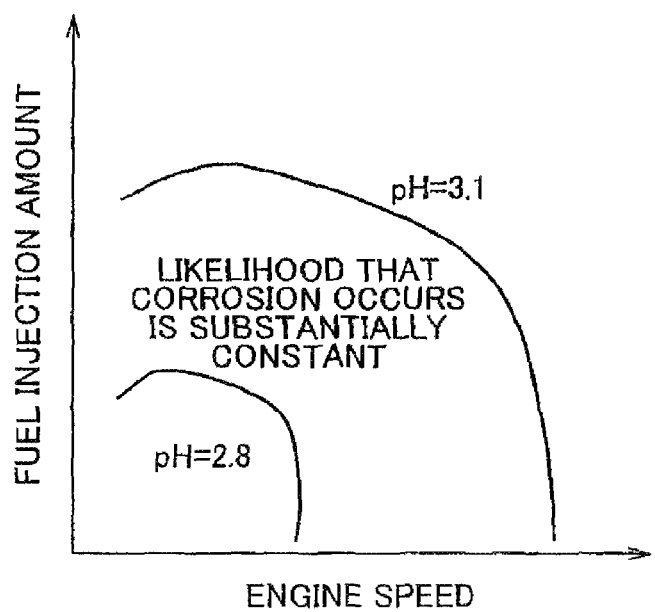

FIGS. 2A and 2B are graphs each showing the relationship between the operating condition of the internal combustion engine 10 and the pH of the exhaust gas condensed water. In each of FIGS. 2A and 2B, the abscissa axis represents the rotational speed of the internal combustion engine 10, and the ordinate axis represents the fuel injection amount. FIG. 2A shows the pH of the exhaust gas condensed water, which is exhibited when the catalyst is active (when the temperature of the catalyst 30 is relatively high). As shown in FIG. 2A, the pH is low in the region in which the engine speed is high and the fuel injection amount is large. Namely, the pH of the exhaust gas condensed water indicates that the exhaust gas condensed water is strongly acidic (pH<3), in other words, the intercooler 24 is more likely to corrode in the region in which the internal combustion engine 10 operates at high speed and high load. It is considered that the intercooler 24 is more likely to corrode because the nitrate ions $NO_3$ described above are increased due to an increase of NOx in the exhaust gas. As described above, when the catalyst is active, the pH of the exhaust gas condensed water varies depending on the operating condition of the internal combustion engine 10.

FIG. 2B shows the pH of the exhaust gas condensed water, which is exhibited when the catalyst is inactive (when the temperature of the catalyst 30 is relatively low). As shown in FIG. 2B, the pH of the exhaust gas condensed water is substantially constant even if the engine speed and the fuel injection amount change. That is, the corrosion environment of the intercooler 24 is substantially constant. More specifically, the pH of the exhaust gas condensed water indicates that the exhaust gas condensed water is strongly acidic (pH<3) in the region in which the internal combustion engine 10 operates at low speed and low load. As described above, when the catalyst is inactive, the pH of the exhaust gas condensed water is substantially constant independently of the operating condition of the internal combustion engine 10. It is considered that the pH of the exhaust gas condensed water, which is exhibited when the catalyst is inactive, is substantially constant due to presence of an acetate ion and a formic ion.

Figure 3:
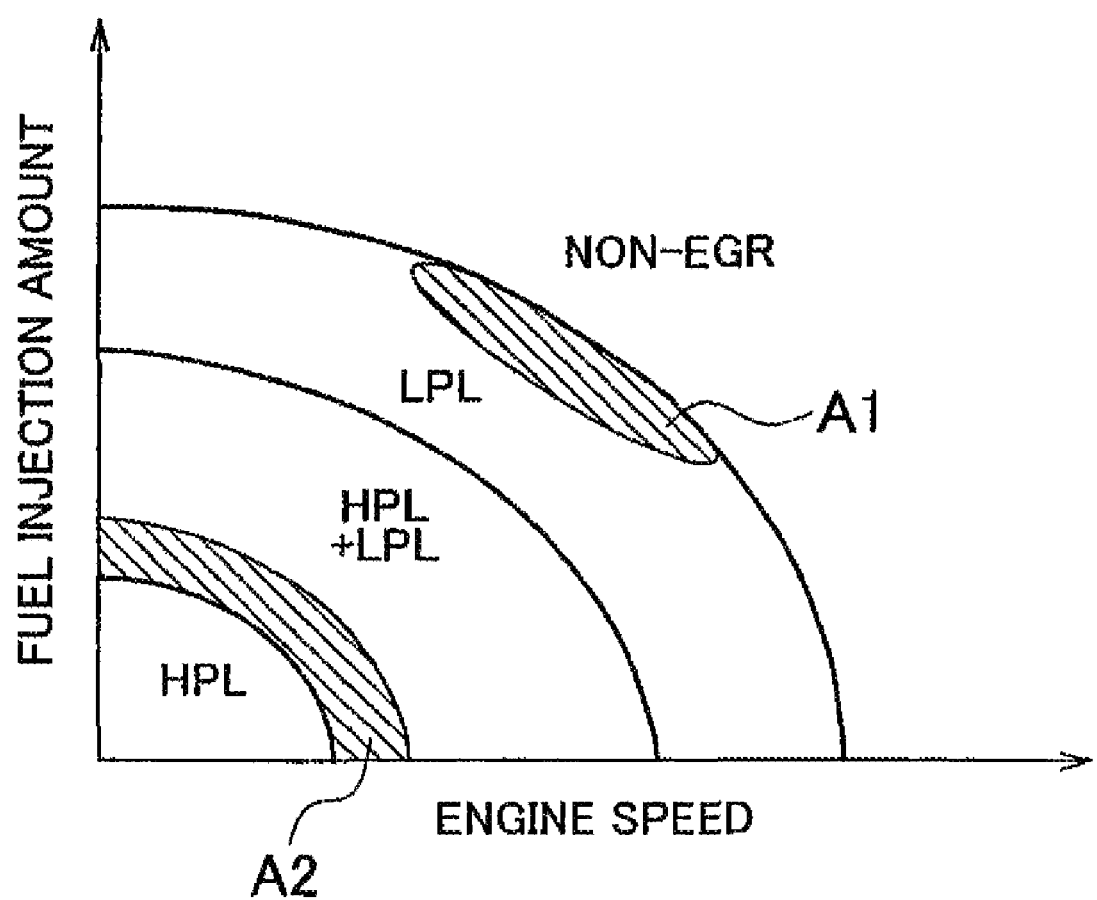
FIG. 3 is a graph illustrating the regions in which a bypass passage is used.

Next, the regions in which the bypass passage 27 is used will be described with reference to FIG. 3. In FIG. 3, the abscissa axis represents the rotational speed of the internal combustion engine 10, and the ordinate axis represents the fuel injection amount. The regions in which the bypass passage 27 is used are superimposed on the EGR modes. The EGR modes will be described below. In the region "HPL" in FIG. 3, only the high-pressure loop EGR unit 50 is used. In the region "HPL+LPL" in FIG. 3, both the high-pressure loop EGR unit 50 and the low-pressure loop EGR unit 51 are used. In the region "LPL" in FIG. 3, only the low-pressure EGR unit 15 is used. In the region "Non-EGR" in FIG. 3, neither the high-pressure loop EGR unit 50 nor the low-pressure loop EGR unit 51 is used.

In the first embodiment of the invention, if the pH of the exhaust gas condensed water indicates that the exhaust gas condensed water is strongly acidic (pH<3) when the engine operating state is within the region in which the low-pressure loop EGR unit 51 is used, it is considered that the intercooler 24 is under the corrosion environment. Therefore, the condition that the engine operating state is within the region in which the low-pressure loop EGR unit 51 is used, and the condition that the exhaust gas is strongly acidic (pH<3) are both satisfied, the bypass passage 27 is used (namely, the intake air flow toward the intercooler 24 is cut off to direct the intake air flow only to the bypass passage 27). In FIG. 3, the regions in which the above-mentioned conditions are both satisfied are the shaded regions A1 and A2. That is, the regions in which the bypass passage 27 is used are the shaded regions A1 and A2. More specifically, the shaded region A1 corresponds to the region in which the bypass passage 27 is used when the catalyst is active, and the shaded region A2 corresponds to the region in which the bypass passage 27 is used when the catalyst is inactive. The shaded regions A1 and A2 roughly correspond to the regions, shown in FIGS. 2A and 2B, in which the exhaust gas condensed water is strongly acidic.

Figure 4:
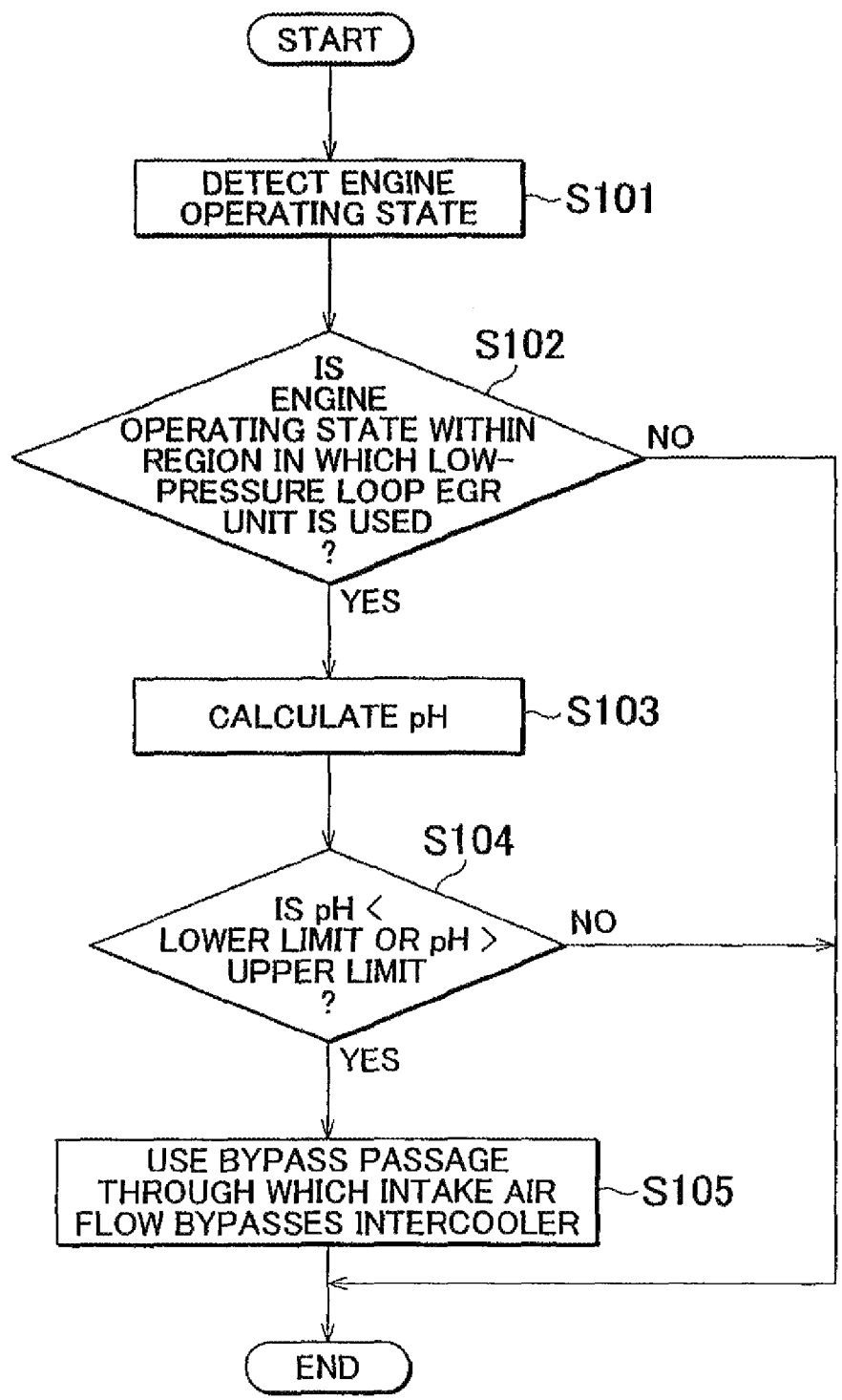
FIG. 4 is a flowchart of a bypass control according to the first embodiment of the invention.

Next, the routine executed in the above-mentioned bypass control will be described with reference to FIG. 4. FIG. 4 is a flowchart showing the bypass control according to the first embodiment of the invention. In the bypass control, the passage through which the intake air flows is selected between the intake passage 20 provided with the intercooler 24 and the bypass passage 27 through which the intake air flow bypasses the intercooler 24, based on the determination as to whether the intercooler 24 is under the corrosion environment. The routine of the control is periodically executed by the ECU 7 at predetermined time intervals.

First, in step S101, the ECU 7 detects the operating state of the internal combustion engine 10. More specifically, the ECU 7 determines the rotational speed of the internal combustion engine 10, the fuel injection amount, the intake air temperature, the amount of exhaust gas recirculated back to the internal combustion engine 10, the coolant temperature, etc. In this case, the ECU 7 receives detection signals S41, S42 and S43 from the intake air temperature sensor 41, the engine speed sensor 42 and the coolant temperature sensor 43, respectively. After step S101 is completed, step S102 is executed.

In step S102, the ECU 7 determines whether the engine operating state is within the region in which the low-pressure loop EGR unit 51 is used, based on the operating state of the internal combustion engine 10, which is detected in step S101. More specifically, the ECU 7 determines whether the engine operation state is within the region in which the low-pressure loop EGR unit 51 is used, based on the rotational speed of the internal combustion engine 10, the fuel injection amount, the coolant temperature, etc. For example, the ECU 7 determines whether the engine operating state is within the region in which the low-pressure loop EGR unit 51 is used, with reference to the map shown in FIG. 3. When the engine operating state is within the region in which the low-pressure loop EGR unit 51 is used ("YES" in step S102), step S103 is executed. On the other hand, when the engine operating state is not within the region in which the low-pressure loop EGR unit 51 is used ("NO" in step S102), the routine ends. In this case, the bypass passage 27 is not used. Namely, the ECU 7 controls the selector valve 26 in such a manner that the intake air flows through only the intake passage 20 provided with the intercooler 24.

In step S103, the ECU 7 calculates the pH of the exhaust gas condensed water based on the operating condition of the internal combustion engine 10, which is detected in step S101. More specifically, the ECU 7 calculates the pH of the exhaust gas condensed water based on the rotational speed of the internal combustion engine 10, the fuel injection amount, the temperature of the catalyst 30, etc. For example, the ECU 7 calculates the pH of the exhaust gas condensed water with reference to the map shown in FIG. 2A or FIG. 2B. In this case, the ECU 7 refers to the map in FIG. 2A when the catalyst is active (when the temperature of the catalyst 30 is relatively high). When the catalyst is inactive (when the temperature of the catalyst 30 is relatively low), the ECU 7 refers to the map in FIG. 2B. As the temperature of the catalyst 30, the ECU 7 may use a temperature detected by a sensor or an estimated temperature. When step S103 is completed, step S104 is executed.

In step S104, the ECU 7 determines whether the pH of the exhaust gas condensed water is lower than the lower limit, or whether the pH of the exhaust gas condensed water is higher than the upper limit. In this case, the ECU 7 determines whether the pH of the exhaust gas condensed water is at a level at which the intercooler 24 will corrode. More specifically, the ECU 7 uses "3" as the lower limit, and "9" as the upper limit. Namely, the ECU 7 determines whether the pH of the exhaust gas condensed water is lower than three (pH<3), or higher than nine (pH>9). Whether the exhaust gas condensed water is higher than nine (pH>9) is determined, because aluminum that forms the intercooler 24 will be corroded by the exhaust gas condensed water having an alkali level of "ph>9" in some cases. Namely, in step S104, it is determined whether the pH of the exhaust gas condensed water is higher than nine (pH>9) in order to reliably prevent corrosion of the intercooler 24.

When the pH of the exhaust gas condensed water is lower than the lower limit, or when the pH of the exhaust gas condensed water is higher than the upper limit ("YES" in step S104), more specifically, when the pH is lower than three (pH<3) or when the pH is higher than nine (pH>9), step S105 is executed. In this case, because the pH of the exhaust gas condensed water is at a level at which the intercooler 24 will corrode, the ECU 7 selects the bypass passage 27 through which the intake air flow bypasses the intercooler 24 (step S105). Namely, the ECU 7 executes the control for cutting off the intake air flow toward the intercooler 24 to direct the intake air flow only to the bypass passage 27. In this case, the ECU 7 controls the selector valve 26 in such a manner that the intake air flow toward the intercooler 24 is cut off and the intake air flow through the bypass passage 27 is permitted. When step S105 is completed, the routine ends.

On the other hand, when the pH of the exhaust gas condensed water is equal to or higher than the lower limit and equal to or lower than the upper limit ("NO" in step S104), more specifically, when the pH of the exhaust gas condensed water is equal to or higher than three and equal to or lower than 9 ($3 \leqq pH \leqq 9$), the routine ends. In this case, the pH of the exhaust gas condensed water is not at a level at which the intercooler 24 will corrode. Namely, the ECU 7 does not select the bypass passage 27 through which the intake air flow bypasses the intercooler 24. In other words, the ECU 7 executes the control for directing the intake air flow only to the intake passage 20 provided with the intercooler 24 and cutting off the intake air flow to the bypass passage 27. In this case, the ECU 7 controls the selector valve 26 in such a manner that the intake air flow is directed toward the intercooler 24 and the intake air flow to the bypass passage 27 is cut off.

According to the bypass control described above, it is possible to appropriately prevent supply of strongly acidic exhaust gas condensed water to the intercooler 24. Namely, it is possible to appropriately prevent occurrence of corrosion environment under which the intercooler 24 will corrode. Therefore, it is possible to increase the corrosion resistance life of the intercooler 24, and effectively suppress deterioration of the function and performance of the intercooler 24 due to corrosion. As a result, it is possible to ensure reliability of the intercooler 24. In addition, it is no longer necessary to apply treatment for providing corrosion resistance to the intercooler 24.

Second Embodiment of the Invention

Next, a second embodiment of the invention will be described. The second embodiment of the invention differs from the first embodiment of the invention in that the pH of the exhaust gas condensed water is detected by a sensor instead of estimating the pH of the exhaust gas condensed water. More specifically, according to the second embodiment of the invention, the pH of the exhaust gas condensed water is detected by a sensor that is provided to the intake passage 20, at a position upstream of the position at which the intercooler 24 is provided and downstream of the position to which the exhaust gas is recirculated back by the low-pressure loop EGR unit 51. Then, the ECU 7 determines whether the pH of the exhaust gas condensed water is at a level at which the intercooler 24 will corrode, based on the detected pH. After that, the ECU 7 executes the bypass control similar to that according to the first embodiment of the invention.

Figure 5:
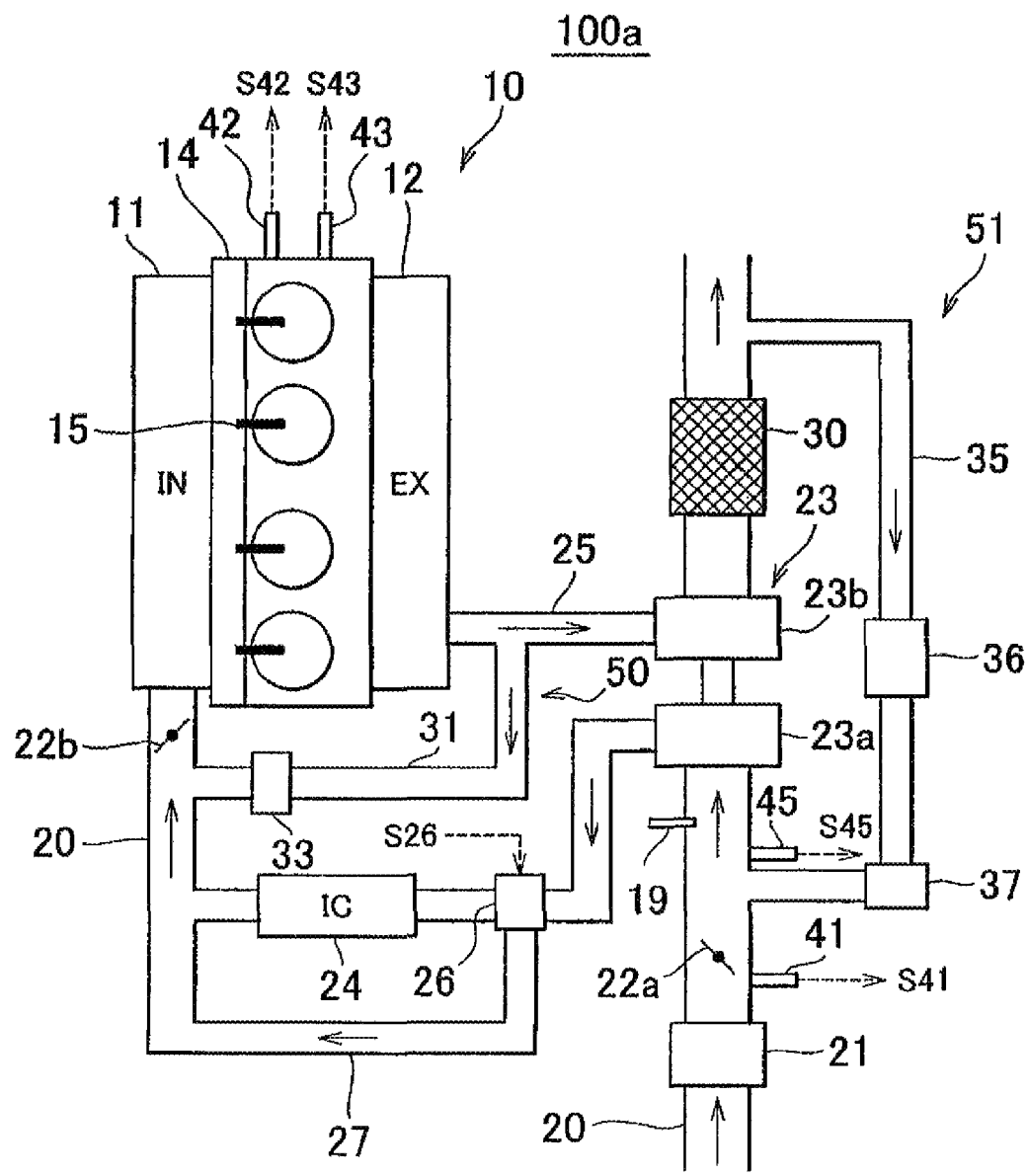
FIG. 5 is a block diagram schematically showing the structure of a control apparatus for an internal combustion engine according to a second embodiment of the invention.
Figure 5:
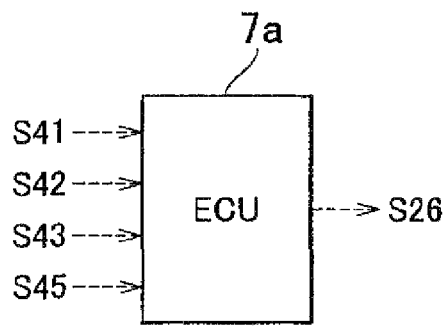

FIG. 5 is a block diagram schematically showing the structure of a control unit 100a for the internal combustion engine according to the second embodiment of the invention. In FIG. 5, the solid arrows indicate a flow of the intake air and a flow of the exhaust gas, and the dashed arrows indicate control signals and detection signals. The same reference numerals will be assigned to the components that are the same as those of the control unit 100 for the internal combustion engine according to the first embodiment of the invention.

In the control unit 100a, a pH sensor 45 is provided to the intake passage, at a position upstream of the position at which the intercooler 24 is provided and downstream of the position to which the exhaust gas is recirculated back by the low-pressure loop EGR unit 51. More specifically, the pH sensor 45 is provided to the intake passage 20, at a position downstream of the position to which the exhaust gas is recirculated back and upstream of the position at which the blow-by gas supply unit 19 is provided. The pH sensor 45 detects the pH of the exhaust gas condensed water, and transmits a detection signal S45 indicating the detected pH to an ECU 7a.

The ECU 7a executes the bypass control by transmitting a control signal S26 to the selector valve 26, based on detection signals S41, S42, S43 and S45 transmitted from the intake air temperature sensor 41, the engine speed sensor 42, the coolant temperature sensor 43, and the pH sensor 45. According to the second embodiment of the invention, the ECU 7 determines whether the pH of the exhaust gas condensed water is at a level at which the intercooler 24 will corrode, namely, whether the pH of the exhaust gas condensed water indicates that the exhaust gas condensed water is strongly acidic, based on the detected pH, and executes the bypass control. More specifically, when it is determined that the pH of the exhaust gas condensed water is at a level at which the intercooler 24 will corrode (for example, pH<3), the ECU 7 executes the control for cutting off the intake air flow toward the intercooler 24 to direct the intake air flow only to the bypass passage 27.

Figure 6:
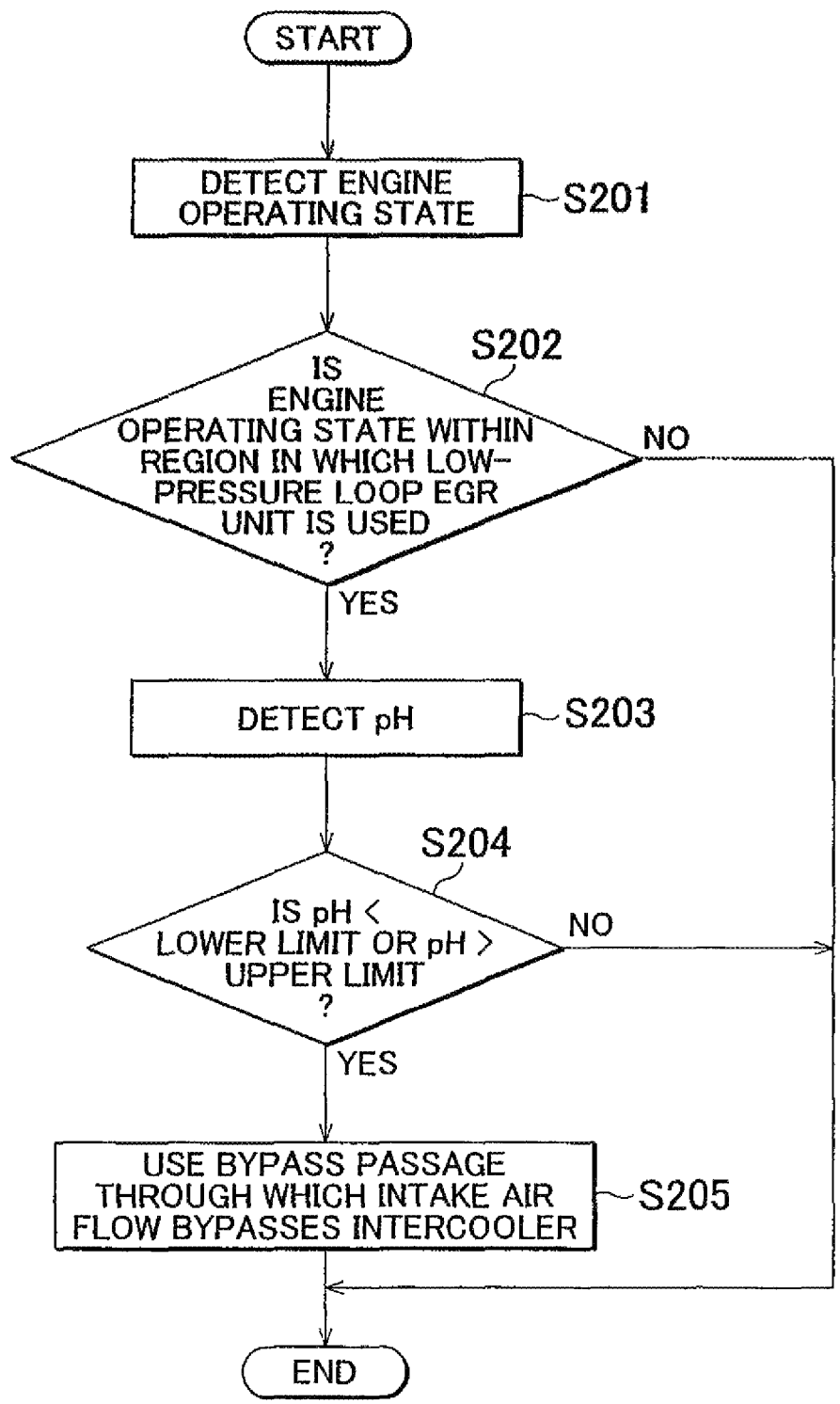
FIG. 6 is a flowchart of a bypass control according to the second embodiment of the invention.

FIG. 6 is a flowchart showing the bypass control according to the second embodiment of the invention. The routine in the control is periodically executed by the ECU 7a at predetermined time internals. Because steps S201, S202, S204 and S205 (steps other than step S203) are the same as above-described steps S101, S102, S104 and S105, respectively, detailed description thereof will not be provided below. Only step S203 will be described below.

In step S203, the ECU 7a detects the pH of the exhaust gas condensed water. More specifically, the ECU 7a receives a detection signal S45 indicating the pH detected by the pH sensor 45. Then, the ECU 7a executes step S204. In step S204, the ECU 7a makes a determination in the manner as described above, based on the pH detected in step S203.

Executing the bypass control according to the second embodiment of the invention also makes it possible to increase the corrosion resistance life of the intercooter 24 and to effectively suppress deterioration of the function and performance of the intercooler 24 due to corrosion.

FIG. 5 shows an example in which the pH sensor 45 is provided to the intake passage 20, at a position downstream of the position to which the exhaust gas is recirculated back and upstream of the position at which the blow-by gas supply unit 19 is provided. However, the position of the pH sensor 45 is not limited to this, as long as the pH sensor 45 is provided at a position upstream of the position at which the intercooler 24 is provided and downstream of the position to which the exhaust gas is recirculated back by the low-pressure loop EGR unit 51. Alternatively, the pH sensor 45 may be provided in the intercooler 24.

In the second embodiment of the invention described above, the bypass control is executed based on the pH detected by the pH sensor 45. However, the parameter used for the bypass control is not limited to the pH of the exhaust gas condensed water. For example, the bypass control may be executed using a NOx sensor that detects the NOx concentration instead of the pH sensor 45. In this case, the components of the exhaust gas are determined based on the value detected by the NOx sensor, whether the intercooler 24 is under the corrosion environment is determined based on the components of the exhaust gas, and the bypass control as described above is executed. The NOx sensor is provided to the exhaust passage 25 (for example, the exhaust passage 25 at a position downstream of the catalyst 30).

The invention claimed is:

1. A control apparatus for an internal combustion engine, comprising:
   an exhaust gas recirculation unit that recirculates exhaust gas back from an exhaust passage, at a portion downstream of a turbine of a turbocharger and a catalyst, to an intake passage, at a portion upstream of a compressor of the turbocharger;
   an intercooler that is provided in the intake passage, at a position downstream of a position to which the exhaust gas is recirculated back by the exhaust gas recirculation unit;
   a bypass passage through which an intake air flow bypasses the intercooler;
   a pH determination unit that determines a pH of condensed water obtained from the exhaust gas recirculated back by the exhaust gas recirculation unit by estimation or detection;
   a corrosion determination unit that determines whether the pH of the condensed water obtained from the exhaust gas is at a level at which the intercooler corrodes, based on the pH determined by the pH determination unit; and
   a bypass control unit that executes a control for cutting off an intake air flow toward the intercooler to direct the intake air flow only to the bypass passage, when the corrosion determination unit determines that the pH of the condensed water obtained from the exhaust gas is at the level at which the intercooler corrodes in a state where the exhaust gas is recirculated back by the exhaust gas recirculation unit.

2. The control apparatus according to claim 1, wherein the pH determination unit estimates the pH of the condensed water obtained from the exhaust gas, based on at least one of a rotational speed of the internal combustion engine, a fuel injection amount, and a temperature of the catalyst.

3. The control apparatus according to claim 1, wherein the pH determination unit detects the pH of the condensed water obtained from the exhaust gas using a sensor that is provided to the intake passage, at a position upstream of the position at which the intercooler is provided and downstream of the position to which the exhaust gas is recirculated back by the exhaust gas recirculation unit.

4. The control apparatus according to claim 1, wherein the bypass passage is defined by a member that is made of a material having a high corrosion resistance.

5. The control apparatus according to claim 1, wherein it is determined that the pH of the condensed water obtained from the exhaust gas is at the level at which the intercooler corrodes, when a pH value of the condensed water obtained from the exhaust gas is lower than three.

6. The control apparatus according to claim 1, wherein it is determined that the pH of the condensed water obtained from the exhaust gas is at the level at which the intercooler corrodes, when a pH value of the condensed water obtained from the exhaust gas is higher than nine.

7. A method for controlling a control apparatus for an internal combustion engine, the control apparatus including:
   an exhaust gas recirculation unit that recirculates exhaust gas back from an exhaust passage, at a portion downstream of a turbine of a turbocharger and a catalyst, to an intake passage, at a portion upstream of a compressor of the turbocharger;
   an intercooler that is provided in the intake passage, at a position downstream of a position to which the exhaust gas is recirculated back by the exhaust gas recirculation unit; and
   a bypass passage through which an intake air flow bypasses the intercooler,
   the method comprising:
   determining a pH of condensed water obtained from the exhaust gas recirculated back by the exhaust gas recirculation unit by estimation or detection;
   determining whether the pH of the condensed water obtained from the exhaust gas is at a level at which the intercooler corrodes, based on the determined pH; and
   executing a control for cutting off an intake air flow toward the intercooler to direct the intake air flow only to the bypass passage, when it is determined that the pH of the condensed water obtained from the exhaust gas is at the level at which the intercooler corrodes in a state where the exhaust gas is recirculated back by the exhaust gas recirculation unit.

8. The method according to claim 7, wherein the pH of the condensed water obtained from the exhaust gas is estimated based on at least one of a rotational speed of the internal combustion engine, a fuel injection amount, and a temperature of the catalyst.

9. The method according to claim 7, wherein the pH of the condensed water obtained from the exhaust gas is detected using a sensor that is provided to the intake passage, at a position upstream of the position at which the intercooler is provided and downstream of the position to which the exhaust gas is recirculated back by the exhaust gas recirculation unit.

10. The method according to claim 7, wherein the bypass passage is defined by a member that is made of a material having a high corrosion resistance.

11. The method according to claim 7, wherein it is determined that the pH of the condensed water obtained from the exhaust gas is at the level at which the intercooler corrodes, when a pH value of the condensed water obtained from the exhaust gas is lower than three.

12. The method according to claim 7, wherein it is determined that the pH of the condensed water obtained from the exhaust gas is at the level at which the intercooler corrodes, when a pH value of the condensed water obtained from the exhaust gas is higher than nine.

* * * * *